United States Patent [19]

Brugel

[11] Patent Number: 4,720,537
[45] Date of Patent: * Jan. 19, 1988

[54] BRANCHED COPOLYETHERKETONES

[75] Inventor: Edward G. Brugel, Wilmington, Del.

[73] Assignee: E. I. Du Pont de Nemours and Company, Wilmington, Del.

[*] Notice: The portion of the term of this patent subsequent to Nov. 3, 2004 has been disclaimed.

[21] Appl. No.: 802,027

[22] Filed: Nov. 25, 1985

[51] Int. Cl.$^4$ .................... C08G 8/02; C08G 14/00
[52] U.S. Cl. ........................... 528/125; 528/192; 528/180; 528/182
[58] Field of Search ............... 528/125, 192, 180, 182

[56] References Cited

U.S. PATENT DOCUMENTS

| | | | |
|---|---|---|---|
| 3,065,205 | 11/1962 | Bonner | 260/63 |
| 3,441,538 | 4/1969 | Marks | 260/49 |
| 3,442,857 | 5/1969 | Thornton | 260/47 |
| 3,516,966 | 6/1970 | Berr | 260/47 |
| 3,524,833 | 8/1970 | Darms | 260/47 |
| 3,637,592 | 1/1972 | Berr | 260/47 |
| 3,666,612 | 5/1972 | Angelo | 161/165 |
| 3,668,057 | 6/1972 | Agolini et al. | 161/165 |
| 3,674,627 | 7/1972 | Angelo | 161/175 |
| 3,767,620 | 10/1973 | Angelo et al. | 260/47 |
| 3,791,890 | 2/1974 | Gander et al. | 260/61 |
| 4,550,155 | 10/1985 | Jones et al. | 528/176 |

FOREIGN PATENT DOCUMENTS 163464 12/1985 European Pat. Off.
2138433A 10/1984 United Kingdom.

*Primary Examiner*—Morton Foelak
*Assistant Examiner*—M. L. Moore

[57] ABSTRACT

Novel branched copolyetherketones comprising condensation products of diphenyl ether, aromatic acid halides and trifunctional comonomers are disclosed.

21 Claims, No Drawings

BRANCHED COPOLYETHERKETONES

BACKGROUND OF THE INVENTION

This invention relates to novel copolyetherketone compositions of matter, to processes for making them, to shaped articles and composite structures prepared from them and to blends of them with other polymers.

Copolymers of aromatic diacid chlorides with diphenyl ether are known in the art. (Such copolymers will be termed "copolyetherketones" in this application). U.S. Pat. Nos. 3,516,966 and 3,637,592, issued to Berr on June 23, 1970, and Jan. 25, 1972, respectively, disclose copolyetherketones having the following repeating structural unit

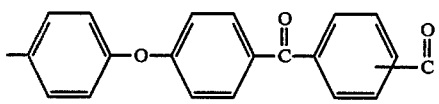

where the

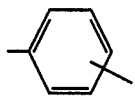

moiety is either

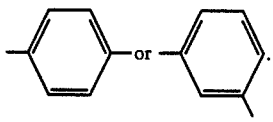

Both patents disclose that the copolyetherketones may be prepared by combining diphenyl ether and a mixture of terephthalyl halide and isophthalyl halide with a Friedel-Crafts catalyst such as boron trifluoride. Further process refinements, and the use of different catalysts, are described in U.S. Pat. No. 3,767,620, issued Oct. 23, 1973, and in U.S. Pat. No. 3,791,890, issued Feb. 12, 1974.

Most commercial applications for copolyetherketones require resins having high molecular weight. Thermoplastic processing applications, such as extrusion, injection molding, and film and sheet forming require a high degree of melt strength during the processing step, and melt strength increases with molecular weight. High molecular weight is also needed for fabrication by sintering processes where free forms are coalesced by heat treatment without pressure. Thus, the ability to increase and control the molecular weight of copolyetherketones is essential to their use.

Heretofore, it has been difficult to attain copolyetherketones of high molecular weight. An obstacle to preparing high molecular weight copolyetherketones of this type is the formation of xanthydrol "dead ends" in the polymer chain when an acid chloride attacks one ring of a previously unreacted diphenylether molecule in an ortho-position followed by ring closure:

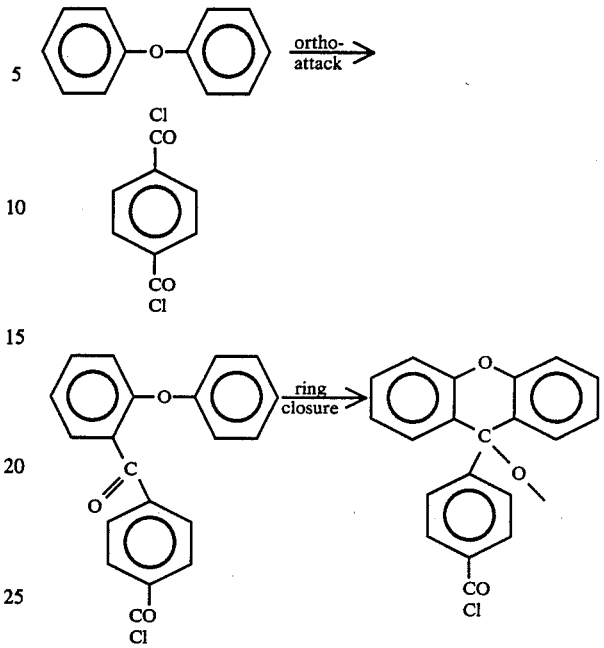

See, for example U.S. Pat. No. 3,767,620, issued Oct. 23, 1973, where the presence of these 9-phenyl xanthydrol end groups is reported.

One way to attain higher molecular weight copolyetherketones is to control the generation of xanthdyrol in the process for their manufacture. This can be done by preparing the intermediate oligomer (2 moles diphenyl ether and 1 mole aromatic diacid chloride) and isolating and purifying that oligomer, by recrystallization, prior to polymerization. This purification step allows one to produce very high molecular weight polymers; however, since the overall process involves two separate steps, its cost makes it unacceptable as a route to commercial quantities of copolyetherketones.

GB Pat. No. 2 138 433A (published Oct. 24, 1984) suggests a process for producing poly(arylene ketones) in which side reactions such as ortho-substitution, alkylation and chain branching are alleged to be suppressed so as to produce high molecular weight, essentially linear polymers. The process comprises polymerizing (1) phosgene or an aromatic diacid dihalide together with a polynuclear aromatic comonomer containing two active hydrogen atoms or (ii) a polynuclear aromatic comonomer containing both an acid halide group and an active hydrogen atom, in the presense of a Lewis acid, optionally a controlling agent (usually a Lewis base) and optionally a non-protic diluent.

There is thus a need for copolyetherketones of high molecular weight that can be prepared by commercially feasible processes.

SUMMARY OF THE INVENTION

Novel copolyetherketones with controlled amounts of branching have now been found that have high molecular weights and that can be prepared via economical, one-reactor processes. These branched copolyetherketones consist essentially of the condensation product of
(a) diphenyl ether (b) one or more aromatic diacid halides or their related free acids; and (c) (3/n) (0.25 to 33) mole %, based on total moles of diphenyl ether and aromatic diacid or diacid halide, of one or more branching agents selected from m-diphenoxy benzene and compounds of the formula R-(COX)$_n$ and their related acids or anhydrides where R is an aromatic moiety, X is a halogen, and n is an integer from 3 to 6; provided that, when the branching agent is m-diphenoxybenzene, the quantity of m-diphenoxybenzene is in the range of about 0.25 to 2 mole %. The incorporation of the branching units into the copolyetherketones has led to high molecular weight polymers with little, if any, adverse effect on other polymer properties.

DESCRIPTION OF THE INVENTION

The branching agents recited above are polyfunctional comonomers, i.e., they are capable of undergoing at least three Friedel-Crafts acylations. There is no limitation on the definition of R as used to define certain of the branching agents except that the resulting compound be capable of undergoing at least three Friedel-Crafts acylations. R may be monocyclic or polycyclic, homocyclic or heterocyclic. R may be additionally substituted provided said substitution does not interfere with the ability of the resulting compound to undergo at least three Friedel-Crafts acylations. Acid halides, particularly acid chlorides, and their related anhydrides are preferred over free acids for use as branching agents. The variable n is preferably 3 or 4. Examples of suitable branching agents include but are not limited to 1,3,5- or 1,2,4-benzene tricarboxylic acid chloride, 3,3',4,4'-benzophenone tetracarboxylic acid dianhydride, 1,4,5,8-naphthalene tetracarboxylic acid chloride, 2,3,6,7-anthracene tetracarboxylic acid chloride, benzene hexacarboxylic acid chloride, 2,2',2''-m-terphenyl tricarboxylic acid chloride, and 5-phenyl-2,4,4',6'-m-terphenyl tetracarboxylic acid chloride. The preferred branching agents, for reasons of efficiency and availability are m-diphenoxy benzene and 1,3,5-benzene tricarboxylic acid chloride. Deemed as equivalent to the invention claimed herein is the use of higher polyfunctional comonomers (n=7 or above) or non-aromatic polyfunctional comonomers as branching agents.

When the branching agent is a trifunctional comonomer (n=3), e.g., 1,3,5-benzene tricarboxylic, the amount of such branching agent incorporated into the copolyetherketone is in the range of 0.25 to 33 mole % based on total moles of diphenyl ether and aromatic diacid or diacid halide. The exception to this is the trifunctional comonomer m-diphenoxy benzene in which case the amount is 0.25 to 2 mole %. When higher polyfunctional comonomers are used as branching agents, the amount of said comonomer is (3/n)(0.25 to 33) mole %. Thus, for example, the range for a tetrafunctional comonomer such as 3,3',4,4'-benzophenone tetracarboxylic acid dianhydride (n=4) would be ($\frac{3}{4}$)(0.25 to 33) mole % or 0.19 to 25 mole %. The preferred quantity of branching agent is (3/n)(0.5 to 1.5) mole %.

Preferred copolyetherketones of this invention are derived from aromatic diacid halides (or related diacids) selected from terephthalyl halide or isophthalyl halide or mixtures of the two, the mixtures being preferably in a ratio of terephthalyl to isophthalyl of 80:20 to 25:75, more preferably in a ratio of 70:30 to 30:70. Virtually any aromatic diacid halide or diacid may, however, be used to prepare the copolyetherketones of this invention, and examples of such electrophilic compounds can be found in U.S. Pat. No. 3,441,538 (particularly at column 5, line 6 to column 6, line 47), the relevant disclosure of which is hereby incorporated by reference.

The branched copolyetherketones of this invention may be prepared by Friedel-Crafts synthesis as described in known art such as U.S. Pat. Nos. 3,065,205 and 3,441,538. The most widely used catalysts are AlCl$_3$ with solvents such as nitrobenzene, chlorobenzene, o-dichlorobenzene, liquid hydrogen bromide, p-dichlorobenzene or methylene chloride; and BF$_3$ with solvents such as anhydrous hydrogen fluoride. The reactants are combined in quantities such that there are essentially equimolar quantities of "acylating" functionalities (e.g., —COCl on terephthalyl chloride or branching agent R(COCl)$_n$) and of "acylatable" functionalities (e.g., acylatable —H's on diphenylether or m-diphenoxybenzene). The quantity of catalyst used should be about one mole per mole acid chloride group, plus two moles per mole acid group, plus 3 moles per mole anhydride group plus one mole per mole of donor, Lewis base atom (e.g., O, S or N). An excess of catalyst, e.g. about 1 to 10%, is useful since it can compensate for varying purity of purchased catalyst and/or adventitious water. Use of a slight excess (e.g., about 1–1.5%) of diphenyl ether has also been found to be advantageous, however as described in copending application U.S. Ser. No. 802,028 (AD-5497), filed simultaneously herewith, an excess of diphenyl ether up to about 8% can be advantageous.

A number of variations in the actual procedure for combining the above-described reactants are available and are illustrated in the examples provided in this application. The preferred process involves combining all of the reactants, except the catalyst, in a solvent and cooling the mixture to approximately 0° to 5° C. The reaction mixture is maintained at this temperature with agitation while catalyst is added and, following such addition, the temperature of the mixture is increased to approximately 100° C. as rapidly as possible (e.g., 5°–10° C. per minute). Rapid heat-up is critical; if it is too slow, the polymer slurry fails to form. The mixture is held at this elevated temperature, with continued agitation, for approximately thirty minutes and cooled to room temperature. The polymer is then isolated by, e.g., treatment with methanol.

It may be possible to modify the structure of the copolyetherketones described and claimed herein by adding small amounts (e.g. up to about 30 mole%) of other monomers which do not alter the overall characteristics of the polymer. Examples of such monomers include but are not limited to monoacylchlorides bearing a readily acetylatable position such as 3- or 4-phenoxylbenzoylchloride, and materials such as bis(4-phenoxy)benzophenone, (4-phenoxyphenyl)benzoyl chloride or (4-phenoxybiphenyl)benzoyl chloride.

The branched copolyetherketones of this invention can be used in the form of shaped articles which can be prepared from the melt phase by extrusion, injection molding, compression molding or other convenient means. Standard sintering processes can also be used to produce useful shapes. Such shaped articles include but are not limited to films, magnetic and audio tape base, filaments, mechanical parts, electrical parts, circuit boards and the like. The copolyetherketones can also be used in the form of coatings. Using common coating techniques, coatings can be applied to wire, films, fabrics, etc.

The copolyetherketones of this invention can also be combined with fibrous substrates or particulate fillers using known methods to form composite structures. Fibrous substrates can include woven, nonwoven, tow, felt or undirectional continuous fibers. For many applications, such as various aerospace components, carbon fibers and aramid fibers, which produce light and strong composites, are the most preferred. Other fibers include, among others, glass, boron and asbestos fibers. Particulate fillers include but are not limited to carbon and graphite powders, mica, silica, clay and silicon carbide whiskers. The composite structures may optionally contain additives such as antioxidants, pigments, coupling agents for fillers, lubricants and anti-stick agents.

The copolyetherketones of this invention may be blended with other high performance polymers to prepare polymer blends useful for a number of purposes. Examples of polymers with which the copolyetherketones may be blended include, but are not limited to, the following:

(a) Polysulfones, such as those disclosed in U.S. Pat. No. 3,795,660, G.B. Pat. No. 1,398,133, G.B. Pat. No. 1,109,842 and G.B. Pat. No. 1,016,245. Specific examples include that having the repeating unit

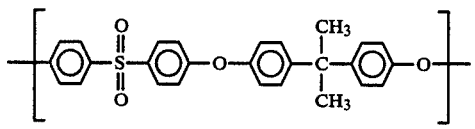

and sold under the tradename Udel by Union Carbide; or that having the repeating unit

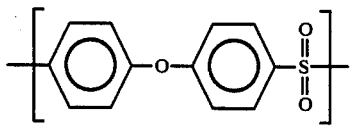

and sold under the tradename Victrex by Imperial Chemical Industries; or that having the repeating unit

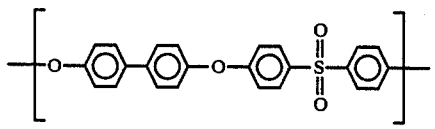

and sold under the tradename Radel by Union Carbide;

(b) Polysulfides, such as those disclosed in U.S. Pat. No. 3,870,687, a specific example being that having the repeating unit

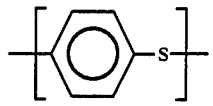

and sold under the tradename Ryton by Phillips Petroleum Company;

(c) Polyphenylene oxides, such as those disclosed in U.S. Pat. No. 3,639,508. An example is the reaction product of polystyrene and

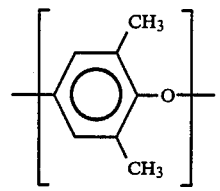

sold under the tradename Noryl by General Electric Company; (d) Polyarylates, such as those prepared from an aromatic dicarboxylic acid and a bisphenol as disclosed in U.S. Pat. Nos. 3,216,970 and 4,126,602. Specific examples are those polyarylates prepared from Bisphenol A and isophthalic and/or terephthalic acid and sold under the tradenames Ardel by Union Carbide and Durel by Occidental Chemical;

(e) Polyetherimides, such as those disclosed in U.S. Pat. No. 3,833,546, a specific example being that having the repeating unit

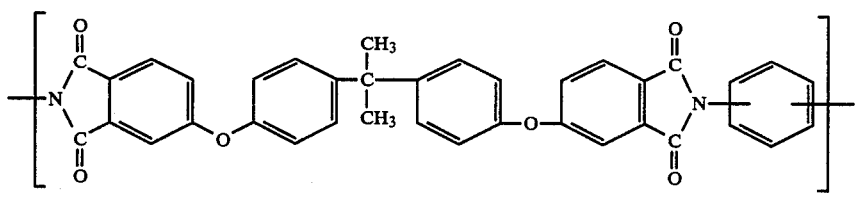

and sold under the tradename Ultem by General Electric Company; and those having the structures as taught in European Patent Application No. 84301679.1, published Oct. 17, 1984 (Publication No. 122060).

The blend may contain about 90 to 10% by weight of the copolyetherketone and, thus, about 10 to 90% by weight of one or more other polymers. Methods of blending polymers are known in the art and include film blending in a press, blending in a mixer (e.g. Haake mixer) and extruder blending.

A special advantage of the copolyetherketones of this invention is their ability to form completely miscible blends with the polyetherimide sold under the tradename Ultem (General Electric Company), this polyetherimide being the reaction product of equimolar amounts of 2,2-bis[4-(3,4-dicarboxy-phenoxy)phenyl]-propane dianhydride and m-phenylenediamine. By completely miscible it is meant that a single Tg (glass transition temperature) is observed for all proportions of the blend, that single Tg falling between the Tg's of the copolyetherketone and the polyetherimide. (The Tg's, for the purpose of determining complete miscibility of blends according to this invention, are obtained from the second heat. In other words, the sample is heated to a temperature above the melting point, cooled to below the first Tg, and then reheated (second heat)). The miscibility of the copolyetherketone-polyetherimide blends is also evidenced by their visual clarity and the presence of homogeneity on a microscopic level.

Because the copolyetherketone-polyetherimide blends are miscible, any heat distortion temperature between that of the copolyetherketone and the polyetherimide can be obtained by blending the two. The blend can be tailored for specific end-use applications of composite and injection molded parts or films as specified by the polyetherketone-polyetherimide proportions. Blending of the polyetherketones of this invention with lower cost but high performance polyetherimides also offers obvious economic advantages.

Generally, the copolyetherketone/polyetherimide blends are completely miscible within the ranges of 10 to 90 weight % of copolyetherketone and 90 to 10 weight % of polyetherimide. Preferably, however, the blends will contain 30 to 70 weight % of copolyetherketone and 70 to 30 weight % of polyetherimide. Additional polymers may also be added to the copolyetherketone/polyetherimide blends.

The branched copolyetherketones of this invention and their preparation are further illustrated by the following examples. In each of these examples, any reference to inherent viscosity (I.V) is a reference to inherent viscosity measured at 0.05 weight % in sulfuric acid and any reference to melt index (M.I.) refers to M.I. measured by five minute preheat 360° C., 8.4 kg load.

COMPARATIVE EXAMPLE A

Hot o-DCB Transfer process for preparing Linear Polyether ketone Ketones

A 3 liter glass lined reactor was charged with 86.38 gms (0.51 moles) diphenyl ether, 50.76 gms (0.25 moles) terephthalyl chloride, 50.76 gms (0.25 moles) isophthalyl chloride and 525 ml o-dichlorobenzene. The mixture was cooled to 0–5 deg C. and 204 gms (1.53 moles) of anhydrous aluminum chloride (J. T. Baker Reagent Grade) were added slowly while maintaining the temperature between 0–5 deg C. Upon completion of the aluminum chloride addition, 1875 ml of o-dichlorobenzene at 130 deg C. were added rapidly (less than 1 min) to the reactor with vigorous stirring. The reaction was heated to 100 deg C. and held for 30 minutes. It was then cooled to room temperature and the o-dichlorobenzene solvent removed via a filter stick. Methanol (1200 ml) was added slowly with agitation and external cooling on the reactor to maintain the temperature below 50 deg C. The mixture was stirred for 30 minutes, filtered and washed twice with water. The polymer was steam distilled for 1 hour to remove residual o-dichlorobenzene and then soaked in formic acid for one hour. It was filtered and dried in a vacuum oven for 8 hours at 180 deg C. I.V.=0.67, M.I.=615 g/10 min.

EXAMPLE 1

Hot o-DCB Transfer process using branching comonomer for preparing branched polyetherketone ketones A 3 liter glass lined reactor was charged with 87.60 gms (0.51 moles) diphenyl ether, 49.00 gms (0.24 moles) terephthalyl chloride, and 425 ml o-dichlorobenzene. The mixture was cooled to 0–5 deg C. and 135 gms (1.01 moles) of anhydrous aluminum chloride (J. T. Baker Reagent Grade) were added slowly while maintaining the temperature between 0–5 deg C. A solution of 49.00 gms (0.24 moles) of isophthalyl chloride in 100 ml o-dichlorobenzene were then added while the temperature was maintained at 0–5 deg C. Aluminum chloride, 67 g (0.50 mole) was then added, keeping the temperature below 5 deg C. Upon completion of the aluminum chloride addition, 1875 ml of o-dichlorobenzene at 130 deg C, were added rapidly (less than 1 min) to the reactor with vigorous stirring. When the reaction temperature reached 65 deg C, 2.0 g (0.0076 moles) 1,3,5-benzene tricarboxylic acid chloride were added. The reaction was heated to 100 deg C. and held for 30 minutes. It was then cooled to room temperature and the o-dichlorobenzene solvent removed via a filter stick. Methanol (1200 ml) was added slowly with agitation and external cooling on the reactor to maintain the temperature below 50 deg C. The mixture was stirred for 30 minutes, filtered and washed twice with water. The polymer was steam distilled for 1 hour to remove residual o-dichlorobenzene and then soaked in formic acid for one hour. It was filtered and dried in a vacuum over for 8 hours at 180 deg C. I.V.=1.02, M.I.=16.

This example uses the same process used in Comparative Example A and shows the appreciable increase in molecular weight attained by incorporation of a small amount of branching agent into the copolyetherketone.

COMPARATIVE EXAMPLE B

One Reactor Process for making Linear Polyether ketone ketone

A 3 liter glass lined reactor was charged with 86.38 gms (0.51 moles) diphenyl ether (99% purity, Dow Chemical Co.), 70.70 gms (0.35 moles) terephthalyl chloride (Du Pont Technical grade), 30.30 gms (0.15 moles) isophthalyl chloride (Du Pont Technical Grade), and 2200 ml of o-dichlorobenzene. The mixture was cooled to 0–5 deg C. and 202 gms (1.51 moles) of anhydrous aluminum chloride (Witco ACL-0008) were added while the temperature was maintained between 0–5 deg C. Upon completion of the aluminum chloride addition the reaction temperature was increased to 100 deg C. for 30 minutes at approximately 5–10 deg/min. The reaction was held at 100 deg C. for 30 minutes and then allowed to cool to room temperature. Once at room temperature, the agitation was stopped and the o-dichlorobenzene removed by means of a vacuum filter stick. Methanol (1200 ml) was then added slowly with agitation and external cooling on the jacket to maintain the temperature below 50 deg C. The mixture was stirred for 30 minutes, filtered and the polymer washed twice with water. The polymer was steam distilled for 1 hour to remove residual o-dichlorobenzene and then soaked in formic acid for one hour. It was filtered and dried in a vacuum oven for 8 hours at 180 deg C. I.V.=0.75, M.I.=288 g/10 min.

EXAMPLE 2

One Reactor Process to make Branched Polyether ketone ketone using Trimesyl chloride A 3 liter glass lined reactor was charged with 87.6 gms (0.515 moles) diphenyl ether (99% purity, Dow Chemical Co.), 70.70 gms (0.35 moles) terephthalyl chloride (Du Pont Technical grade), 30.30 gms (0.15 moles) isophthalyl chloride (Du Pont Technical grade), 1.30 gms 1,3,5-benzene tricarboxylic acid chloride (trimesyl chloride) (0.005 moles) and 2200 ml of o-dichlorobenzene. The mixture was cooled to 0–5 deg C. and 202 gms (1.51 moles) of anhydrous aluminum chloride (Witco ACL-0008) were added while the temperature was maintained between 0–5 deg C. Upon completion of the aluminum chloride addition the reaction temperature was increased to 100 deg C. for 30 minutes at approximately 5–10 deg/min. The reaction was held at 100 deg C. for 30 minutes and then allowed to cool to room temperature. Once at room temperature, the agitation was stopped and the o-dichlorobenzene removed by means of a vacuum filter stick. Methanol (1200 ml) was then added slowly with agitation and external cooling on the jacket to maintain the temperature below 50 deg C. The mixture was stirred for 30 minutes, filtered and the polymer washed twice with water. The polymer was steam distilled for 1 hour to remove residual o-dichlorobenzene and then soaked in formic acid for one hour. It was filtered and dried in a vacuum oven for 8 hours at 180 deg C. I.V.=0.88, M.I.=38 g/10 min.

EXAMPLE 3

One Reactor Process to make Branched Polyether ketone ketone using m-Phenoxybenzene A 3 liter glass reactor was charged with 86.38 gms (0.51 moles) of diphenyl ether (99% purity, Dow Chemical Co.), 70.70 gms (0.35 moles) terephthalyl chloride (Du Pont Technical grade), 30.30 gms (0.15 moles) isophthalyl chloride (Du Pont Technical grade), 2.00 gms (0.0076 moles) m-diphenoxybenzene, and 2200 ml o-dichlorobenze. The mixture was cooled to 0–5 deg C. and 202 gms (1.51 moles) of anhydrous aluminum chloride (Witco ACL-0008) were added while the temperature was maintained between 0.5 deg C. Upon completion of the aluminum chloride addition the reaction temperature was increased to 100 deg C. at approximately 5–10 deg/min. The reaction was held at 100 deg C. for 30 minutes and then allowed to cool to room temperature. Once at room temperature, the agitation was stopped and the o-dichlorobenzene removed by means of a vacuum filter stick. Methanol (1200 ml) was then added slowly with agitation and external cooling on the jacket to maintain the temperature below 50 deg C. The mixture was stirred for 30 minutes, filtered and the polymer washed twice with water. The polymer was steam distilled for 1 hour to remove residual o-dichlorobenzene and then soaked in formic acid for one hour. It was filtered and dried in a vacuum oven for 8 hours at 180 deg C. I.V.=0.92, M.I.=26 g/10 min.

EXAMPLE 4

One Reactor Process for Branched Polyetherketone Ketones using 3,3',4,4'-Benzophenone tetracarboxylic acid dianhydride A 3 liter glass reactor was charged with 88.00 gms (0.527 moles) of diphenyl ether (99.9% purity, Dow Chemical Co.), 70.70 gms (0.35 moles) terephthalyl chloride (Du Pont Technical grade), 30.30 gms (0.15 moles) isophthalyl chloride (Du Pont Technical grade), 2.12 gms (0.0066 moles) 3,3',4,4'-benzophenone tetracarboxylic acid dianhydride, and 2200 ml of o-dichlorobenzene. The mixture was cooled to 0–5 deg C. and 202 gms (1.51 moles) of anhydrous aluminum chloride (Witco ACL-0008) were added while the temperature was maintained between 0–5 deg C. Upon completion of the aluminum chloride addition the reaction temperature was increased to 100 deg C. at approximately 5–10 deg/min. The reaction was held at 100 deg C. for 30 minutes and then allowed to cool to room temperature. Once at room temperature, the agitation was stopped and the o-dichlorobenzene removed by means of a vacuum filter stick. Methanol (1200 ml) was then added slowly with agitation and external cooling on the jacket to maintain the temperature below 50 deg C. The mixture was stirred for 30 minutes, filtered and the polymer washed twice with water. The polymer was steam distilled for 1 hour to remove residual o-dichlorobenzene and then soaked in formic acid for one hour. It was filtered and dried in a vacuum oven for 8 hours at 180 deg C. I.V.=0.88, M.I.=74 g/10 min.

Examples 2, 3 and 4 all utilize the same process used in Comparative Example B and demonstrate the appreciable increase in molecular weight attained by incorportion of a small amount of branching agent into the copolyetherketone.

COMPARATIVE EXAMPLE C

Split Acid Chloride Process for making polyetherketone ketones

A 3 liter glass reactor is charged with 2100 ml o-dichlorobenzene, 87.55 g (0.515 moles) diphenyl ether (99%, Dow Chemical Co.), 49.49 (0.245 moles) terephthalyl chloride (Du Pont Co.), and 21.21 g (0.105 moles) isophthalyl chloride (Du Pont Co.). The mixture was cooled to 0–5 deg C. and 269 g (2.00 moles) aluminum chloride (Witco ACL-0008) were added while maintaining the temperature below 5 deg C. The reaction mixture was then warmed at 5 deg/min to 50 deg C. and the following were added: 21.21 g (0.105 moles) terephthalyl chloride and 9.09 g (0.045 moles) isophthalyl chloride. The reaction temperature was increased to 100 deg C. at approximately 5–10 deg/min. The reaction was held at 100 deg C. for 30 minutes and then allowed to cool to room temperature. Once at room temperature, the agitation was stopped and the o-dichlorobenzene removed by means of a vacuum filter stick. Methanol (1200 ml) was then added slowly with agitation and external cooling on the jacket to maintain the temperature below 50 deg C. The mixture was stirred for 30 minutes, filtered and the polymer washed twice with water. The polymer was steam distilled for 1 hour to remove residual o-dichlorobenzene and then soaked in formic acid for one hour. It was filtered and dried in a vacuum oven for 8 hours at 180 deg C. I.V.=0.55, M.I.=2000.

EXAMPLE 5

Split Acid Chloride Porcess for preparing branched polyetherketone ketones

A 44 gal glass reactor was charged with 30 gal o-dichlorobenzene, 4347 g (25.57 moles) diphenyl ether (99%, Dow Chemical Co.), 1692.0 g (8.37 moles) terephthalyl chloride (Du Pont Co.) and 725 g (3.59 moles) isophthalyl chloride (Du Pont Co.). The mixture was cooled to 0–5 deg C. and 12,533 g (94.24 moles) aluminum chloride (Witco ACL-0008) were added while maintaining the temperature below 5 deg C. The reaction mixture was then warmed at 5 deg/min to 50 deg C. and the following were added: 1692 g (8.37 moles) terephthalyl chloride, 725 g (3.59 moles) isophthalyl chloride and 145 g (0.53 moles) 1,3,4-benzene tricarboxylic acid chloride. The reaction temperature was increased to 100 deg C. at approximately 3 deg C./min. The reaction was held at 100 deg C. for 30 minutes and then allowed to cool to room temperature. Once at room temperature the agitation was stopped and the o-dichlorobenzene removed by means of a vacuum filter stick. Methanol (1200 ml) was then added slowly with agitation and external cooling on the jacket to maintain the temerature below 50 deg C. The mixture was stirred for 30 minutes, filtered and the polymer washed with water. The polymer was steam distilled for 1 hour to removed residual o-dichlorobenzene and then soaked in formic acid for 1 hour. It was filtered and dried in a vacuum oven for 8 hours at 180 deg C. M.I.=10.

EXAMPLE 6

Split Acid Chloride Process for making Branched Polyetherketone Ketones

A 3 liter glass reactor was charged with 2100 ml o-dichlorobenzene, 90.20 g (0.53 moles) diphenyl ether (99%, Dow Chemical Co.), 52.62 g (0.26 moles) terephthalyl chloride (Du Pont Co.). The mixture was cooled to 0–5 deg C. and 269 g (2.00 moles) aluminum chloride (Witco ACL-0008) were added while maintaining the temperature below 5 deg C. The reaction mixture was then warmed at 5 deg/min to 50 deg C. and the following were added: 18.13 g (0.089 moles) terephthalyl chloride, 31.1 g (0.154 moles) isophthalyl chloride and 2.0 g (0.0075 moles) m-diphenoxybenzene. The reaction temperature was increased to 100 deg C. at approximately 5-10 deg/min. The reaction was held at 100 deg C. for 30 minutes and then allowed to cool to room temperature. Once at room temperature, the agitation was stopped and the o-dichlorobenzene removed by means of a vacuum filter stick. Methanol (1200 ml) was then added slowly with agitation and external cooling on the jacket to maintain the temperature below 50 deg C. The mixture was stirred for 30 minutes, filtered and the polymer washed twice with water. The polymer was steam distilled for 1 hour to remove residual o-dichlorobenzene and then soaked in formic acid for one hour. It was filtered and dried in a vacuum oven for 8 hours at 180 deg C. M.I.=1.

Examples 5 and 6 use the same process used in Comparative Example C and show the appreciable increase in molecular weight attained by incorporation of a small amount of branching agent into the copolyetherketone.

COMPARATIVE EXAMPLE D

Solution Process (0 deg C.) for making Polyetherketone ketones

A 500 ml, three-neck, round bottom flask was charged with 168 g methylene chloride and 100 g Aluminum Chloride (0.75 moles) (anhydrous, Witco ACL-0008). The mixture was cooled to −25 deg C. and a solution of 50 g methylene chloride and 20 g acetone (0.35 moles) was added slowly, keeping the temperature below −10 deg C. After the addition was complete a second mixture, consisting of 30 g methylene chloride, 20.6 g diphenyl ether (0.121 moles, Dow Chemical co., 99% Pure), 17.0 g terephthalyl chloride (0.084 moles, Du Pont Co. Technical Grade) and 7.2 g isophthalyl chloride (0.036 moles, Du Pont Co. Technical Grade), was added slowly keeping the reaction temperature below −15 deg C. The reaction was allowed to warm to 0 deg C. and stirred at that temperature for 6 hours. It was then allowed to warm to room temperature where it was stirred for an additional 12 hours.

The reaction mixture was then quenched by pouring slowing into a Waring Blender containing 1000 ml of water and 10 ml HCl. The mixture was allowed to stir for ½ hour and then filtered. The fine, white polymer was washed twice in 1000 ml methanol, soaked in formic acid for one hour, and dried in a vacuum oven at 180 deg C. for 8 hours. M.I.=354.

EXAMPLE 7

Solution Process (0 deg C.) for preparation of Branched Polyetherketone ketones

A 500 ml, three-neck, round bottom flask was charged with 168 g methylene chloride and 100 g aluminum chloride (0.75 moles) (anhydrous, Witco ACL-0008). The mixture was cooled to −25 deg C. and a solution of 50 g methylene chloride and 25 g dimethylformamide (0.35 moles) was added slowly, keeping the temperature below −10 deg C. After the addition was complete a second mixture, consisting of 30 g methylene chloride, 21.3 g diphenyl ether (0.125 moles, Dow Chemical co,. 99% Pure), 17.0 g terephthalyl chloride (0.084 moles, Du Pont Co. Technical Grade) and 7.2 g isophthalyl chloride (0.036 moles, Du Pont Co. Technical Grade), and 0.4 g 1,3,5-benzene tricarboxylic acid chloride (0.0018 moles), was added slowly, keeping the reaction temperature below −15 deg C. The reaction was allowed to warm to 0 deg C. and stirred at that temperature for 6 hours. It was then allowed to warm to room temperature where it was stirred for an additional 12 hours.

The reaction mixture was then quenched by pouring slowly into a Waring Blender containing 1000 ml water and 10 ml HCl. The mixture was allowed to stir for ½ hour and then filtered. The fine, white polymer was washed twice in 1000 ml methanol, soaked in formic acid for one hour, and dried in a vacuum oven at 180 deg C. for 8 hours. M.I.=20.

EXAMPLE 8

Solution Process (0 deg C.) for Preparing Branched Polyetherketone ketones

A 500 ml, three-neck, round bottom flask was charged with 168 g methylene chloride and 100 g Aluminum Chloride (0.75 moles) (anhydrous, Witco ACL-0008). The mixture was cooled to −25 deg C. and a solution of 50 g methylene chloride and 20 g acetone (0.35 moles) was added slowly, keeping the temperature below −10 deg C. After the addition was complete a second mixture, consisting of 30 g methylene chloride, 20.6 g diphenyl ether (0.121 moles, Dow Chemical co., 99% Pure), 17.0 g terephthalyl chloride (0.084 moles, Du Pont Co. Technical Grade) and 7.2 g isophthalyl chloride (0.036 moles, Du Pont Co. Technical Grade) and 0.4 g 1,3,5-benzene tricarboxylic acid chloride (0.0018 moles), was added slowly, keeping the reaction temperature below −15 deg C. The reaction was allowed to warm to 0 deg C. and stirred at that temperature for 6 hours. Then allowed to warm to room temperature where it was stirred for an additional 12 hours.

The reaction mixture was then quenched by pouring slowly into a Waring Blender containing 1000 ml of water and 10 ml HCl. The mixture was allowed to stir for ½ hour and then filtered. The fine, white polymer was washed twice in 1000 ml methanol, soaked in formic acid for one hour, and dried in a vacuum oven at 180 deg C. for 8 hours. M.I.=no flow.

Examples 7 and 8 use the same process used in Comparative Example D and show the appreciable increase in molecular weight achieved by incorporation of a small amount of branching agent in the copolyetherketone.

COMPARATIVE EXAMPLE E

Solution Process (0 deg C.) for preparing Polyetherketone ketones

A 500 ml, three-neck, round bottom flask was charged with 168 g methylene chloride and 100 g aluminum chloride (0.75 moles) (anhydrous, Witco ACL-0008). The mixture was cooled to −25 deg C. and a solution of 50 g methylene chloride and 25 g dimethylformamide (0.35 moles) was added slowly, keeping the temperature below −10 deg C. After the addition was complete a second mixture, consisting of 30 g methylene chloride, 21.3 g diphenyl ether (0.121 moles, Dow Chemical co., 99% Pure), 17.0 g terephthalyl chloride (0.084 moles, Du Pont Co. Technical Grade) and 7.2 g isophthalyl chloride (0.036 moles, Du Pont Co. Technical Grade), and 0.5 g m-diphenoxybenzene (0.0018 moles), was added slowly, keeping the reaction temperature below −15 deg C. The reaction was allowed to warm to 0 deg C. and stirred at that temperature for 6 hours. It was then allowed to warm to room temperature where it was stirred for an additional 12 hours.

The reaction mixture was then quenched by pouring slowing into a Waring Blender containing 1000 ml of water and 10 ml HCl. The mixture was allowed to stir for ½ hour and then filtered. The fine, white polymer was washed twice in 1000 ml methanol, soaked in formic acid for one hour, and dried in a vacuum oven at 180 deg C. for 8 hours. M.I.=364.

This was a solution process run using DMF as the solubilizing agent. m-Diphenoxybenzene was added at the same concentration as 1,3,5-benzenetricarboxylic acid chloride in the previous two Examples. However, it is believed that the low reaction temperature kept the m-diphenoxybenzene from undergoing a third acylation (branching) and thus kept the polymer from attaining as high a molecular weight as attained in the previous two examples. Thus, the higher temperature processes should be used when m-diphenoxybenzene is used as branching agent.

EXAMPLE 9

'50 DEG Reaction' process for making Branched Polyetherketone Ketones

A 3 liter glass reactor was charged with 1800 ml o-dichlorobenzene, 90.20 g (0.53 moles) diphenyl ether (99%, Dow Chemical Co.). The mixture was cooled to 0–5 deg C. and 202 g (1.51 moles) aluminum chloride (Witco ACL-0008) were added while maintaining the temperature below 5 deg C. The reaction mixture was then warmed at 5 deg/min to 50 deg C. and the following were added: 400 ml o-dichlorobenzene containing 70.30 g (0.350 moles) terephthalyl chloride, 30.30 g (0.150 moles) isophthalyl chloride and 2.0 g (0.0075 moles) 1,3,5-benzene tricarboxylic acid chloride. The reaction temperature was increased to 100 deg C. at approximately 5–10 deg/min. The reaction was held at 100 deg C. for 30 minutes and then allowed to cool to room temperature. Once at room temperature, the agitation was stopped and the o-dichlorobenzene removed by means of a vacuum filter stick. Methanol (1200 ml) was then added slowly with agitation and external cooling on the jacket to maintain the temperature below 50 deg C. The mixture was stirred for 30 minutes, filtered and the polymer washed twice with water. The polymer was steam distilled for 1 hour to remove residual o-dichlorobenzene and then soaked in formic acid for one hour. It was filtered and dried in a vacuum oven for 8 hours at 180 deg C. I.V.=41, M.I.=200.

This example demonstrates that the zero degree oligomerization step can be eliminated if some branching agent is used.

EXAMPLE 10

'50 DEG Reaction' process for preparing Branched Polyetherketone Ketones

A 3 liter glass reactor was charged with 1800 ml o-dichlorobenzene, 89.25 g (0.525 moles) diphenyl ether (99%, Dow Chemical Co.). The mixture was cooled to 0–5 deg C. and 202 g (1.51 moles) aluminum chloride (Witco ACL-0008) were added while maintaining the temperature below 5 deg C. The reaction mixture was then warmed at 5 deg/min to 50 deg C. and the following were added: 400 ml o-dichlorobenzene containing 65.81 g (0.326 moles) terephthalyl chloride, 28.20 g (0.139 moles) isophthalyl chloride and 8.0 g (0.03 moles) 1,3,5-benzene tricarboxylic acid chloride. The reaction temperature was increased to 100 deg C. at approximately 5–10 deg/min. The reaction was held at 100 deg C. for 30 minutes and then allowed to cool to room temperature. Once at room temperature, the agitation was stopped and the o-dichlorobenzene removed by means of a vacuum filter stick. Methanol (1200 ml) was then added slowly with agitation and external cooling on the jacket to maintain the temperature below 50 deg C. The mixture was stirred for 30 minutes, filtered and the polymer washed twice with water. The polymer was steam distilled for 1 hour to remove residual o-dichlorobenzene and then soaked in formic acid for one hour. It was filtered and dried in a vacuum oven for 8 hours at 180 deg C. I.V.=0.71, M.I.=137.

When Examples 9 and 10 are repeated without benzene tricarboxylic acid chloride, the polymer slurry does not form and a gummy polymeric mass forms around the agitator.

EXAMPLE 11

Hot o-DCB Transfer Process For Preparing Branched Polyetherketone

A 3 liter glass lined reactor was charged with 86.4 gms (0.51 moles) diphenyl ether, 48.5 gms (0.24 moles) terephthalyl chloride, 2.65 gms (0.01 moles) 1,3,5-benzene tricarboxylic acid chloride and 425 ml o-dichlorobenzene. The mixture was cooled to 0–5 deg C. and 140 gms (1.05 moles) of anhydrous aluminum chloride (J. T. Baker Reagent Grade) were added slowly while maintaining the temperature between 5 deg C. A solution of 48.5 gms (0.24 moles) isophthalyl chloride in 100 ml o-dichlorobenzene was added while the temperature was maintained at 0–5 deg C. Aluminum chloride, 65 gms (0.49 moles), was then added keeping the temperature below 5 deg C.

Upon completion of the aluminum chloride addition, 1875 ml of o-dichlorobenzene at 130 deg C., were added rapidly (less than 1 minute) to the reactor with vigorous agitation. The reaction was then heated to 100 deg C. for 30 minutes. It was then cooled to room temperature and the o-dichlorobenzene removed with a filter stick. Methanol (1200 ml) was added slowly with agitation and external cooling on the reactor to maintain the temperature between 50 deg C. The mixture was stirred for 30 minutes, filtered and washed twice with methanol. The polymer was steam distilled for 1 hour to remove residual solvent and then soaked in formic acid for one hour. It was filtered and dried in a vacuum oven for 8 hours at 180 deg C. I.V.=1.24, M.I.=<1.

Examples 12 and 13 illustrate the preparation of blends of polyetherimides with copolyetherketones of this invention. In both examples, the copolyetherketone is a copolymer of diphenylether and terephthalic and isophthalic acid chloride, in a ratio of 70 T/30 I, with 0.75 mole % 1,3,5-benzenetricarboxylic acid (BTAC), prepared as described in this application.

EXAMPLE 12

Blends of Ultem ® polyetherimide (General Electric Co.) and 70T/30I BTAC polyetherketone were prepared by a film blending operation carried out in a press. The polymers were mixed in a dry condition, placed between stainless steel plates, and pressed into a film at 370 deg C. This film was then cut into strips. The strips were stacked on top of one another and repressed into a film. The pressing and repressing operation was repeated for a total of ten times. Film blends were made in this manner covering the whole blend range from 100% polyetherketone to 100% polyetherimide.

The film blends in this series were characterized by the glass transition temperature (Tg) as determined by differential scanning calorimetry (DSC). The observed Tg values were taken as the midpoint in the step change in the specific heat and were determined from the DSC scan obtained in the 2nd heat. In making a DSC run, the sample is heated to a temperature above the melting point, cooled to below the first Tg, and then reheated (2nd heat). The heating and cooling rates are 20 deg/min. Each of the blends exhibited a single glass transition temperature as shown by the DSC data given below.

| Blend | Tg (deg C.) |
|---|---|
| 1. 100% PEK | 159 |
| 2. 90% PEK/10% PEI | 166 |
| 3. 80% PEK/20% PEI | 171 |
| 4. 70% PEK/30% PEI | 175 |
| 5. 60% PEK/40% PEI | 182 |
| 6. 50% PEK/50% PEI | 186 |
| 7. 40% PEK/20% PEI | 193 |
| 8. 30% PEK/70% PEI | 197 |
| 9. 20% PEK/80% PEI | 205 |
| 10. 10% PEK/90% PEI | 211 |
| 11. 100% PEI | 218 |

PEK = polyetherketone
PEI = polyetherimide

EXAMPLE 13

Another series of blends of Ultem ® polyetherimide and 70T/30I BTAC polyetherketone (made using exact same polymers as Series #1 above) were prepared using a Haake Rehocord mixer fitted with roller mixing blades. The polymers were added to the mixing chamber with the rotors at 10 rpm. Five minutes after addition started the rotor speed was increased to 100 rpm. Blending was continued at 360 deg C. and 100 rpmm for 10 minutes under a nitrogen atmosphere. The melts, on removal from the mixer, cooled to solid blends. The blends were mechanically chopped into fine pellets and compression molded at a temperature of 360 deg C. into 3"×⅛" plaques. The plaques were machined into test specimens for measurement of mechanical properties. The glass transition temperatures of the blends were determined using differential scanning calorimetry. These properties are presented in the following table.

| BLEND | A | B | C | D | E |
|---|---|---|---|---|---|
| % PEK | 95.0 | 90.0 | 85.0 | 80.0 | 40.0 |
| % PEI | 5.0 | 10.0 | 15.0 | 20.0 | 60.0 |
| Flex Modulus, kpsi | 619.0 | 627.0 | 617.0 | 550.0 | 471.0 |
| $T_b$, kpsi | 11.8 | 8.9 | 9.1 | 7.5 | 12.8 |
| $E_b$, kpsi | 1.9 | 1.6 | 1.9 | 1.6 | 4.0 |
| Tg, deg C. | 166.0 | 169.0 | 172.0 | — | 194.0 |

PEK = polyethylene
PEI = polyetherimide
Flex Modulus determined by ASTM D790
$T_b$, $E_b$ = Tensile strength, Elongation at Break

What is claimed is:

1. A copolyetherketone consisting essentially of the condensation product of
   (a) diphenyl ether
   (b) one or more aromatic diacid halides or their related free acids; and
   (c) (3/n)(0.25 to 33) mole %, based on total moles of diphenyl ether and aromatic diacid or diacid halide, of one or more branching agents selected from the group consisting of m-diphenoxybenzene and compounds of the formula R-(COX)$_n$ and their related acids and anhydrides, where R is an aromatic moiety, X is a halogen, and n is an integer from 3 to 6; provided that, when the branching agent is m-diphenoxybenzene, its quantity is in the range of about 0.25 to 2 mole %.

2. A copolyether ketone of claim 1 wherein the quantity of branching agent is about (3/n)(0.5 to 1.5) mole %.

3. A copolyetherketone of claim 1 where n is 3 or 4.

4. A copolyetherketone of claim 1 where the branching agent is an acid halide or anhydride or the mixture thereof.

5. A copolyetherketone of claim 1 where the branching agent is selected from m-diphenoxybenzene, 1,2,4- or 1,3,5-benzenetricarboxylic acid, 3,3',4,4'-benzophenone tetracarboxylic acid, dianhydride, 1,4,5,8-naphthalene tetracarboxylic acid chloride, benzene hexacarboxylic acid chloride, 2,2',2"-m-terphenyl tricarboxylic acid chloride and 5-phenyl-2,4,4',6'-m-terphenyl tetracarboxylic acid chloride.

6. A copolyetherketone of claim 5 wherein the branching agent is 1,3,5-benzenetricarboxylic acid chloride.

7. A copolyetherketone of claim 5 where the brancing agent is m-diphenoxybenzene.

8. A copolyetherketone of any of claims 5, 6 and 7 where the quantity of branching agent is about 0.5 to 1.5 mole %.

9. A copolyetherketone of claim 1 where the aromatic diacid halide is selected from terephthalyl halide or isophthalyl halide or mixtures thereof.

10. A copolyetherketone of claim 9 where the aromatic diacid halide comprises a mixture of terephthalyl halide and isophthalyl halide in a ratio in the range of 80:20 to 25:75.

11. A copolyetherketone one of claim 10 where the ratio of terephthalyl halide ot isophthalyl halide is in the range of 70:30 to 30:70.

12. A copolyetherketone of claim 5 where the aromatic diacid halide is selected from terephthalyl halide or isophthalyl halide or mixtures thereof.

13. A copolyetherketone of claim 12 where the aromatic diacid halide comprises a mixture of terephthalyl halide and isophthalyl halide in a ratio in the range of 80:20 to 25:75.

14. A copolyetherketone of claim 13 where the ratio of terephthalyl halide to isophthalyl halide is in the range of 70:30 to 30:60.

15. A copolyetherketone of claim 1 where the branching agent is selected from m-diphenoxybenzene or 1,3,5-benzenetricarboxylic acid, the quantity of said branching agent is 0.5 to 1.5 mol %, and the aromatic diacid halide comprises a mixture of terephthalyl halide and isophthalyl halide in a ratio in the range of 80:20 to 25:75.

16. A process for preparing a copolyetherketone of any of claims 1, 2, 5, 6, 7 or 15 consisting essentially of contacting appropriate quantities of (a) diphenyl ether, (b) said benzyl diacid halides or their related free acids, (c) said branching agent in the presence of an appropirate quantity of Friedel-Crafts catalyst.

17. A process of claim 16 where said diphenyl ether, said benzyl diacid halide or related free acid, and said branching agent are combined in an appropriate solvent with said Friedel-Crafts catalyst at a temperature of about 0°–5° C., following which the resulting reaction mixture is rapidly heated to a temperature of about 100° C.

18. A shaped article obtained by extruding, compression molding or injection molding a copolyetherketone of any of claim 1, 2, 5, 6, 7 or 15.

19. A composite structure consisting essentially of (a) a copolyetherketone of any of claims 1, 2, 5, 6, 7 or 15 and (b) either a fibrous substrate or a particulate filler.

20. A blend of (a) 90 to 10% by weight of an copolyetherketone of claim 1 and (b) 10 to 90% by weight of one or more polymers selected from polysulfones, polysulfides, polyphenylene oxides, polyarylates, and polyetherimides.

21. A blend of (a) 90 to 10% by weight of a copolyetherketone of any of claim 1, 2, 5, 6, 7 or 15 and (b) 10 to 90% by weight of an aromtic polyetherimide of the formula:

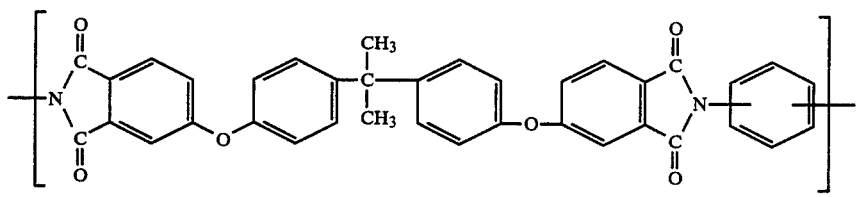

* * * * *